US006937803B2

(12) United States Patent
Bruegl et al.

(10) Patent No.: US 6,937,803 B2
(45) Date of Patent: Aug. 30, 2005

(54) DISPLAY ARRANGEMENT FOR FADING OPTICAL INFORMATION INTO AN OBSERVER'S FIELD OF VIEW

(75) Inventors: Juergen Bruegl, Los Altos, CA (US); Richard A. Pelletier, Newbury Park, CA (US)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 376 days.

(21) Appl. No.: 09/922,005

(22) Filed: Aug. 6, 2001

(65) Prior Publication Data

US 2003/0026586 A1 Feb. 6, 2003

(51) Int. Cl.[7] ........ G02B 6/06
(52) U.S. Cl. ........ 385/117; 385/115; 385/116; 385/118
(58) Field of Search ........ 385/115, 116, 385/117, 118; 359/384, 362, 363, 367, 431; 356/241.3, 241.4, 241.5

(56) References Cited

U.S. PATENT DOCUMENTS 3,740,115 A * 6/1973 Cole ........ 385/25
3,994,557 A * 11/1976 Hopkins ........ 359/374
4,541,698 A * 9/1985 Lerner ........ 396/373
4,699,463 A * 10/1987 D'Amelio et al. ........ 385/118
4,753,224 A * 6/1988 Tojo ........ 356/241.5
5,000,533 A * 3/1991 Gerwers ........ 385/117
6,500,115 B2 * 12/2002 Krattiger et al. ........ 600/173

FOREIGN PATENT DOCUMENTS

WO WO 98/13721 4/1998

OTHER PUBLICATIONS

German Office Action dated Oct. 8, 2003.

* cited by examiner

*Primary Examiner*—Robert H. Kim
*Assistant Examiner*—Michael H Caley
(74) *Attorney, Agent, or Firm*—Crowell & Moring LLP

(57) ABSTRACT

A display arrangement for providing optical information into an observer's field of view, which can be carried at the head, includes a picture source, a picture transmission device and an eyepiece. The picture transmission device consists of at least partially of a fiber optics section which is at least partially surrounded by a material that is plastically deformable.

7 Claims, 2 Drawing Sheets

DISPLAY ARRANGEMENT FOR FADING OPTICAL INFORMATION INTO AN OBSERVER'S FIELD OF VIEW

BACKGROUND AND SUMMARY OF THE INVENTION

The invention relates to a display arrangement for fading optical information into an observer's field of view.

A display arrangement of this generic type is disclosed, for example, in U.S. Pat. No. 5,348,477, and further technical environment is provided in German Patent Document DE 40 09 947 A1 and German Patent Document DE 196 20 658 A1. U.S. Pat. No. 5,348,477, however, relates particularly to the optical construction of the picture transmission device. The manner of fastening and adjusting the display arrangement in front of the eye is not discussed.

Furthermore, from U.S. Pat. Nos. 5,585,871; 5,266,977; and 4,796,987 disclose display arrangements for fading optical information into an observer's field of view, in which glass fiber optical waveguides are provided for picture transmission between a picture source and an eyepiece. Such glass fiber optical waveguides are disadvantageous due to safety considerations, and the risk of breakage.

It is an object of the invention to provide a flexible display arrangement with simple adjusting possibilities.

This and other objects and advantages are achieved by the display arrangement for fading optical information into an observer's field of view according to the invention, which has a picture source, a picture transmission device and an eyepiece. This display arrangement can be worn on the head and, for this purpose, preferably has a fastening device which interacts, for example, with a spectacle frame, a head band or a helmet.

At least a part of the picture transmission device consists of a fiber optics section which comprises a bundle of acrylic optical waveguides that are flexible, and not fragile. This fiber optics section is at least partially surrounded by a material, preferably metal, which is bendable and which remains in the shape assumed as a result of the bending (mechanical memory effect) . The sheathing according to the invention is preferably an aluminum tube which is glued together with the fiber optics section.

This invention provides a simple and cost-effective adjusting device of the eyepiece in front of the eye.

According to a feature of the invention, an adjusting mechanism is provided between the picture source and the picture transmission device, for securing the picture transmission device in its momentary (axial) position after a torsion movement in the fiber optics section. In this manner, the picture which appears before the eye by way of the eyepiece, can be rotated by a torsion of the fiber optics section. This permits a simple and optimal alignment of the picture.

In another advantageous embodiment of the invention, the eyepiece has optical elements and a setting mechanism for setting the optical elements. Here, the optical elements preferably have lenses, the setting mechanism preferably being a rotatable ring for setting the focus. As a result, the clarity of the picture can be adjusted directly at the eyepiece.

Other objects, advantages and novel features of the present invention will become apparent from the following detailed description of the invention when considered in conjunction with the accompanying drawings.

DETAILED DESCRIPTION OF THE DRAWINGS

Figure 1:
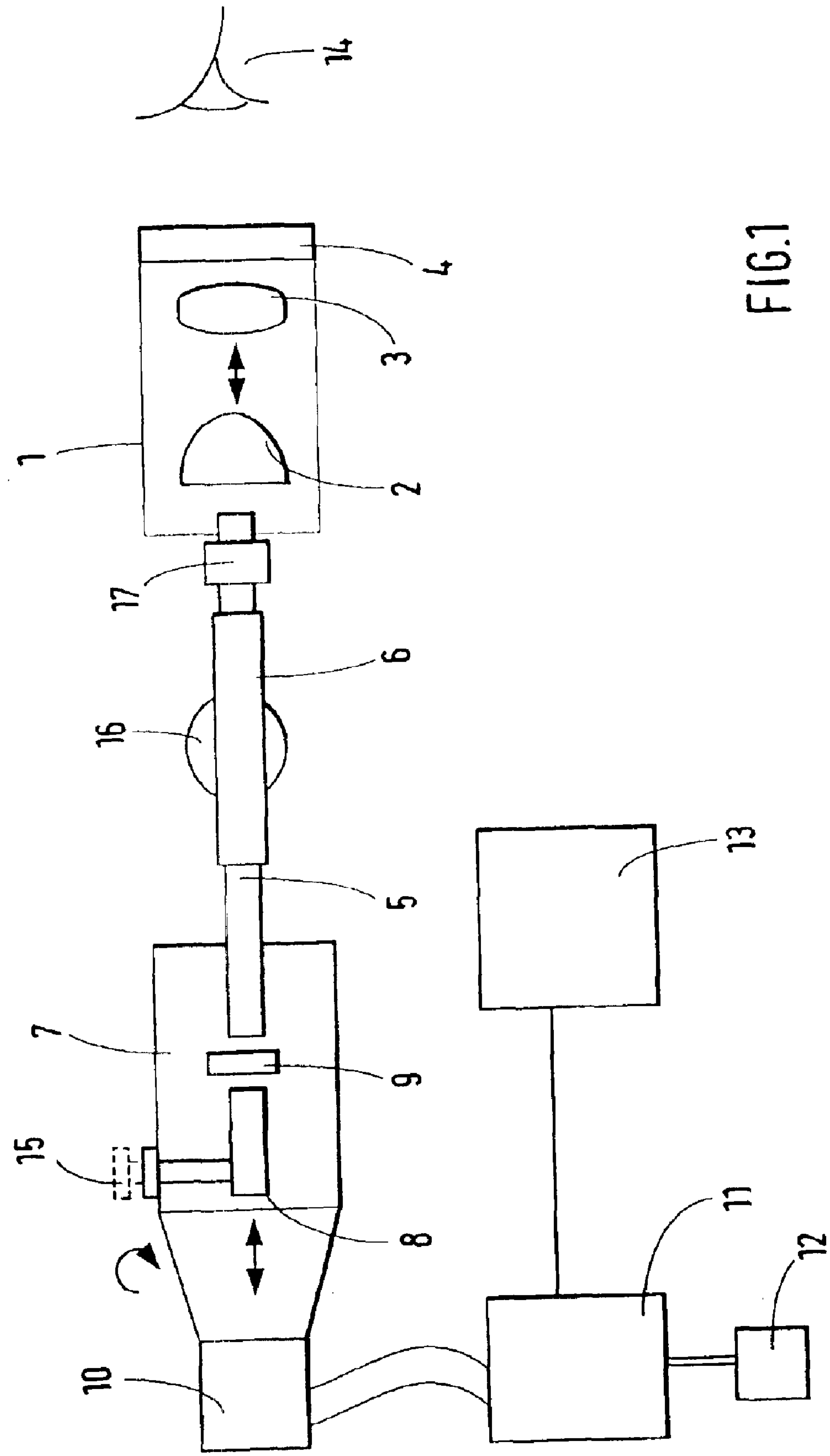
FIG. 1 is a schematic block diagram of the display arrangement with a possible control device.

In FIG. 1, a picture source 10 is connected with a picture signal generating unit 11, which is controlled by way of a control unit 13 and is supplied with electric energy by way of a battery 12. The picture source 10 is, for example, a controllable small LCD module, as known from German Patent Document DE 40 09 947 A1. The signals can be transmitted between the picture signal generating unit 11 and the picture source 10 can be transmitted, for example, by radio or via cable.

The picture source 10 is connected with a cylindrical holding part 7, which together with an adjusting screw 15, forms an adjusting mechanism.

A rod-shaped lens 8 is connected by way of a glued connection 9 with a fiber optics section 5 in the form of an acrylic optical waveguide. The lens 8, the glued connection 9 and the fiber optics section 5 form a picture transmission device between the picture source 10 and an eyepiece 1. The eyepiece 1 has optical elements in the form of a mirror 2 and a biconvex lens 3. By way of a setting mechanism 4 in the form of a rotatable setting ring, the distance can be changed between the mirror 2 and the lens 3, whereby the focus can be set for reaching the required sharpness.

The eyepiece 1 is connected with the fiber optics section 5 by way of a flange 17. The fiber optics section 5 is at least partially surrounded by an aluminum tube, which can be bent to adjust the eyepiece in the desired position in front of the eye 14. For fastening the entire display arrangement, a clamp 16 can be mounted around the aluminum tube 6 (for example, for the fastening on a crash helmet). It is important that, as a result of the flexible fiber optics section 5 in conjunction with the bendable metal sheathing, a very simple adjusting mechanism is achieved.

As a result of the adjusting mechanism between the picture source 10 and the picture transmission device 8, 9, 5, consisting of the holding part 7 and the adjusting screw 15, the picture transmission device can, after a torsion movement (which is permitted by the flexible fiber optics section 5), be secured in its momentary position. As a result, a rotation of the picture is permitted in the eyepiece 1 without having to change the position of the picture source 10.

Figure 2:
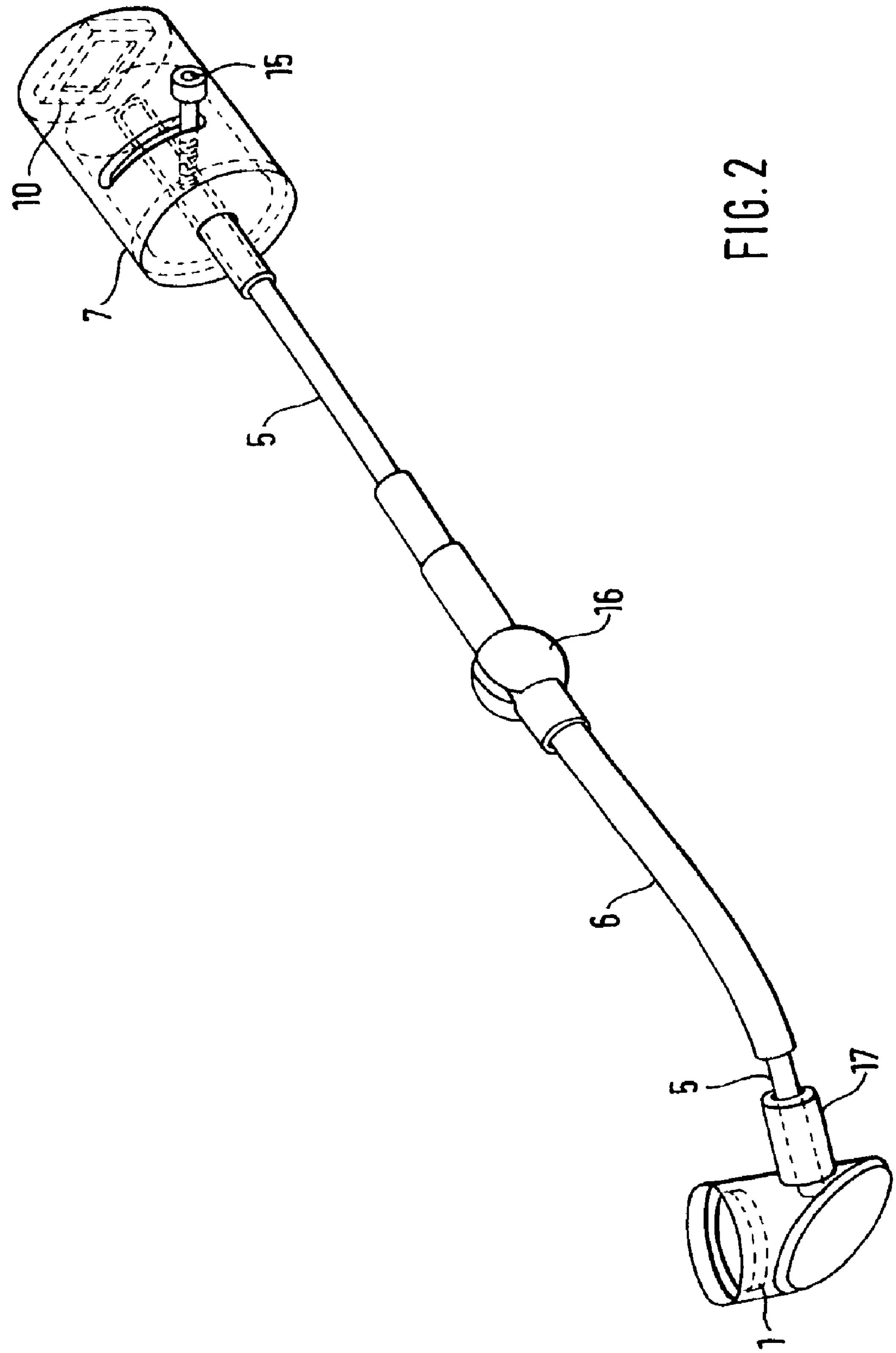
FIG. 2 is a possible embodiment of the display arrangement for a fastening on a motorcycle helmet.

FIG. 2 again shows the display arrangement of FIG. 1 according to the invention without the picture signal generating unit 11, the control unit 13 and the battery 12. These three components 11, 12 and 13 absent in FIG. 2 may be housed at an arbitrary site during a radio remote transmission. The picture source 10 is preferably fastened on the rear of a helmet. The clamp 16 is preferably mounted on the side of a helmet. The eyepiece 1 is set in the direct proximity in front of the eye 14. The display arrangement can be used, for example, for displaying vehicle data, particularly the speed or the rotational speed or for displaying navigation data.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Display arrangement for providing optical information in an observer's field of view, comprising:

an eyepiece;

a signal source which provides extrinsically generated information to be replicated in a desired orientation in said eyepiece;

a display unit coupled to said signal source for displaying an image containing information received from said signal source;

an image transmission device for transmitting said image from said display unit to said eyepiece, for displaying said information displayed in said desired orientation; wherein, the image transmission device includes a fiber optics section;

the fiber optics section is at least partially encased in and fixed in a spatial configuration by a material which is bendable and which remains in a shape assumed by a bending, whereby said information may deviate from said desired orientation in said eyepiece; and said display arrangement further comprises a setting means mechanically coupling said display unit and said image transmission device, for eliminating a deviation of said image from said desired orientation, by rotating said image within said eyepiece so that said information is displayed in said desired orientation, and for securing the picture transmission device in its momentary position after a deformation of in the fiber optics section.

2. The display arrangement according to claim 1, wherein the eyepiece has optical elements and a setting mechanism for setting the optical elements.

3. A display arrangement, comprising:

an eyepiece for displaying an image in a field of view of a viewer's eye;

a signal source which provides extrinsically generated information to be replicated in a desired orientation in said eyepiece;

a display unit coupled to said signal source for displaying an image containing information received from said signal source;

an elongate plastically deformable image transmission device which mechanically and optically couples said image source and said eyepiece, and transmits said image to said eyepiece, said transmission device being deformable into a configuration in which said eyepiece is positioned in the viewer's field of view, such deforming also causing possible deviation of said image from said desired orientation; and a setting means arranged between the picture source and the picture transmission device, for offsetting said deviation by rotating said image within said eyepiece, and for securing the picture transmission device in its momentary position after a deformation of the picture transmission device.

4. The display arrangement according to claim 3, wherein said picture transmission device comprises:

a fiber optic section; and a plastically deformable sheathing which encases at least a part of said fiber optic section and fixes it to a desired spatial configuration.

5. The display arrangement according to claim 4, wherein said sheathing comprises a metallic material.

6. Display arrangement for providing optical information in an observer's field of view, comprising:

a picture source which displays an image containing externally generated information in a desired orientation;

a picture transmission device; and an eyepiece; wherein the picture transmission device includes a fiber optics section;

the fiber optics section is at least partially encased in a material which is deformable and which remains in a shape assumed by a deformation; and adjusting means are provided for rotating orientation of said image within said eyepiece to restore it to said desired orientation following a deformation of said fiber optics section, said adjusting means comprising a setting means arranged between the picture source and the picture transmission device, whereby the picture transmission device can be secured in its momentary position after said deformation.

7. The display arrangement of claim 6, wherein:

said fiber optics section has an image receiving axis which is directed at said image display unit;

said setting means includes means for rotating said fiber optics section relative to said image display unit, about said image input axis, and for fixing said fiber optics section in a desired rotational orientation relative to said image display unit.

* * * * *